United States Patent Office 2,814,656
Patented Nov. 26, 1957

2,814,656
PROCESS FOR THE PREPARATION OF CYCLIZED RUBBER

Hendrik Jan Jacob Janssen, Delft, Netherlands, assignor to Rubber Stichting, Delft, Netherlands, a foundation organized under Netherland law No Drawing. Application August 8, 1955, Serial No. 527,117

Claims priority, application Netherlands August 11, 1954

5 Claims. (Cl. 260—734)

The invention relates to the preparation of entirely or partially cyclized rubber from natural rubber with the aid of an organic sulphonic acid.

Many processes have been suggested to prepare cyclized rubber from rubber solutions, solid rubber and latex with the aid of various cyclizing agents.

U. S. P. 1,668,235 describes a process in which rubber is mixed with an organic sulphonic acid in a mill, whereupon the mixture is heated outside the mill during 3-40 hours.

U. S. P. 1,705,757 describes the simultaneous admixture of an organic sulphonic acid and a plastifier for rubber in rubber, whereupon the mixture is heated in a furnace during approximately 8 hours.

These methods in which sulphonic acid is used as the cyclizing agent have the drawback of a long cyclisation period (3-40 hours).

German Patent 576,349 describes the admixture of a surface active substance to the rubber, whereupon the mixture is heated in an autoclave during approximately 5 hours; the reaction mixture is purified by first dissolving it in a solvent and thereupon evaporating again this solvent. Finally the residue obtained is post-heated at reduced pressure for several hours. As surface active substances, there are mentioned carbon black activated with phosphoric acid or Ton Sil AC (a fuller's earth marketed by I. G. Farben Industrie, Germany).

This method which requires a cyclisation period of 5 hours, moreover, has the drawback that heating takes place in an autoclave and that an expensive solvent is to be used.

According to the present invention entirely or partially cyclized rubber is obtained by mixing and reacting natural rubber with an organic sulphonic acid and silica or a silicate having an active surface.

The combination of organic sulphonic acid and silica or silicate gives the advantage that the cyclisation reaction proceeds very rapidly (approximately 10-30 minutes) and that no complicated apparatus is necessary. At the same time the additional advantage is obtained that the mixing and the cyclisation reaction may be effected in the same apparatus.

The mixing of rubber, sulphonic acid and silica or silicates may be performed in a mixing apparatus heated to approximately 140-150° C., whereupon the temperature increases automatically and the cyclisation starts, to be completed in approximately 10-30 minutes. It also is feasible to mix first the rubber with the organic sulphonic acid and the silica or silicates without the application of external heat and thereupon heating the mixture to 140-150° C., whereupon the cyclisation is also completed in approximately 10-30 minutes. The speed of the cyclizing reaction can be controlled by variations in the quantities of sulphonic acid, and silica or silicates which are mixed and reacted with the rubber.

Organic sulphonic acids are used as cyclizing agents because other known cyclizing agents would attack the metallic mixing apparatus too strongly owing to their corrosive character.

The sulphonic acid should not contain more than 1½ mol of water per 1 mol of sulphonic acid. The quantity of sulphonic acid required amounts to 5 parts by weight per 100 parts by weight of rubber as a minimum, preferably approximately 6½-10 parts are used dependent on the degree of cyclisation required. A very suitable sulphonic acid is p-toluene sulphonic acid.

A large addition of sulphonic acid entails a considerable increase of the speed of the reaction so that in most cases the reaction proceeds so rapidly that only completely (i. e. for approximately 85%) cyclized rubber is obtained.

Silica (silicon dioxide) or silicates with an active surface which are very suitable for the invention are i. a. Ultra-Sil $VN_3$, Aero-Sil, Duro-Sil and china clay. Ultra-Sil $VN_3$ is a finely divided silica which under this name is marketed by Chemische Fabrik Wesseling A. G. Aero-Sil and Duro-Sil consist of finely divided calcined silica which under these names is marketed by "Deutsche Gold und Silber Scheideanstalt Degussa." The quantity of the finely divided silica or silicates which is to be added amounts at least to 5 parts by weight per 100 parts by weight of natural rubber. Preferably 5 to 10 parts are used.

A large addition of silica also effects acceleration of the reaction but the reaction proceeds more quietly and is susceptible of being arrested so any desired degree of cyclisation may be achieved. The termination of the reaction may be achieved by the addition of magnesium oxide or another acid binding substance. In order to assure a quiet progress of the reaction, it is quite often very useful to stop the mixer, once all substances have been introduced therein, for about one minute, whereafter the mixer is started again; once the cyclization has started, it is completed in about 10 minutes. If a lower degree of cyclization is desired, the reaction simply is arrested earlier.

As a mixing apparatus a so-called "internal mixer" of the type Werner-Pfleiderer is very suitable, although, of course, any mixing apparatus in which high polymers can be mixed with other substances is suitable.

Example 1

100 parts by weight of R. S. S. I (=Ribbed Smoked Sheet first quality) were mixed with 8 parts by weight of technical para toluene sulphonic acid 1 aq (commercial grade, not purified) and 7 parts by weight of Aero Sil in a Werner Pfleiderer which before had been heated to approximately 130° C. During mixing no further heat was applied. After approximately 10 minutes the temperature of the mixture had increased to approximately 150° C. Thereupon 1½ parts by weight of magnesium oxide were added. The cyclized rubber obtained had been cyclized for 80%. The degree of cyclisation was determined by determination of the chlorine content after addition of hydrochloric acid.

Example 2

100 parts by weight of rubber (in the form of low-priced blankets) were mixed with 7 parts by weight of technical para-toluene sulphonic acid 1 aq and 5 parts by weight of Aero Sil in the same manner as indicated in Example 1 during 10 minutes, the temperature of the mixture increasing to approximately 160° C. After addition of 1½ parts of magnesium oxide it appeared that the cyclized rubber obtained had been cyclized for 78%.

Example 3

100 parts by weight of R. S. S. I (=Ribbed Smoked Sheet first quality) were mixed with 10 parts by weight of technical para-toluene sulphonic acid 1 aq and 5 parts by weight of Aero-Sil during 10 minutes in the same manner as indicated in Example 1, the temperature of the mixture increasing to approximately 180° C. After addition of 1½ parts of magnesium oxide it appeared that the cyclized rubber obtained had been cyclized completely (i. e. for 85%).

*Example 4*

100 parts by weight of crepe rubber were mixed with 10 parts by weight of technical para-toluene sulphonic acid 1 aq and 7 parts by weight of Aero-Sil during 10 minutes in the same manner as described in Example 1, the temperature of the mixture increasing to approximately 170° C. After addition of magnesium oxide it appeared that the cyclized rubber obtained had been cyclized for 70%.

*Example 5*

100 parts by weight of R. S. S. III (=Ribbed Smoked Sheet third quality) were mixed on a normal mixing mill at a roll temperature of approximately 60–80° C. with 10 parts by weight of technical para-toluene sulphonic acid 1 aq and 10 parts by weight of Ultra-Sil VN₃ (finely divided $SiO_2$ marketed by Chemische Fabrik Wesseling A. G.) and thereupon heated in a stove to 150° C. The cyclisation reaction which had already started below 150° C. further proceeded spontaneously, the temperature increasing to approximately 270° C. After 25 minutes the reaction was complete and it appeared that the cyclized rubber obtained had been cyclized for 77%.

*Example 6*

100 parts by weight of R. S. S. III were mixed on a normal mixing mill at a roll temperature of approximately 60–80° C. with 10 parts by weight of technical para-toluene sulphonic acid 1 aq and 10 parts by weight of china clay and thereupon heated in a stove to 175° C. The cyclisation reaction which had already started below 150° C. further proceeded spontaneously, the temperature increasing to approximately 290° C. The reaction was complete after 14 minutes and it appeared that the cyclized rubber obtained had been cyclized for 76%.

What is claimed is:

1. A process for preparing at least partly cyclized rubber from natural rubber, comprising mixing rubber, an organic sulfonic acid, and a compound selected from the class consisting of finely divided, large surface silica and silicates, and maintaining said mixture for about 3 to about 30 minutes at a temperature from about 150 to about 270° C.

2. The process according to claim 1, wherein the reactants are mixed in an internal mixer, said mixer is heated to below 150° C., and the heat of the reaction increases the temperature above 150° C.

3. The process according to claim 1, wherein the reactants are mixed in a mill, the mixture thus obtained is subsequently transferred to a stove heated to about 150° C., and the heat of reaction increases the temperature in the stove to about 270° C.

4. The process according to claim 1, wherein the sulfonic acid contains at most about 1½ mol of water per 1 mol of sulfonic acid.

5. The process according to claim 1, wherein the sulfonic acid is p-toluene sulfonic acid.

No references cited.